Aug. 4, 1925.                                          1,548,554
                        K. RÖDER
       MULTISTAGE TOOTHED WHEEL GEARING FOR THE PROPULSION
              OF SHIPS BY MEANS OF STEAM TURBINES
                     Filed Sept. 3, 1921
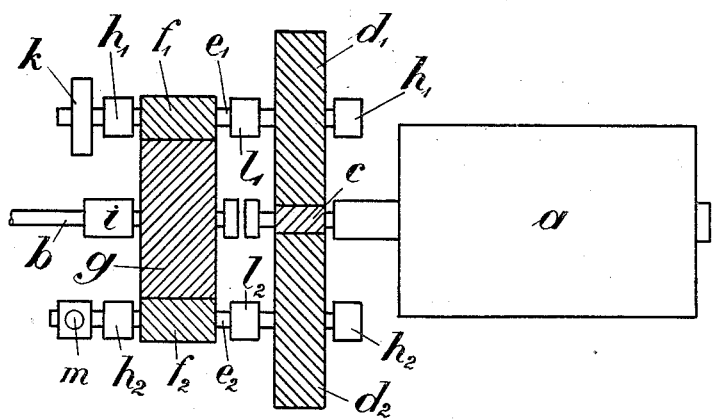
Inventor
K. Röder,
By Marks&Clerk
   Attys.

Patented Aug. 4, 1925.

1,548,554

UNITED STATES PATENT OFFICE.

KARL RÖDER, OF MULHEIM-RUHR, GERMANY, ASSIGNOR TO AKTIENGESELLSCHAFT BROWN, BOVERI & CIE., OF BADEN, SWITZERLAND.

MULTISTAGE TOOTHED WHEEL GEARING FOR THE PROPULSION OF SHIPS BY MEANS OF STEAM TURBINES.

Application filed September 3, 1921. Serial No. 498,393.

(GRANTED UNDER THE PROVISIONS OF THE ACT OF MARCH 3, 1921, 41 STAT. L., 1313.)

*To all whom it may concern:*

Be it known that I, KARL RÖDER, a citizen of the German Realm, residing at No. 31 Hohenweg, Mulheim-Ruhr, Germany, have invented certain new and useful Improvements in Multistage Toothed Wheel Gearing for the Propulsion of Ships by Means of Steam Turbines (for which I have obtained a patent in Germany, No. 340,582, of August 3, 1921), of which the following is a specification.

In the use of steam turbines for driving the screw propellers of low-speed cargo steamers and passenger steamers, very great speed reductions must be employed, because for good efficiency the screw propellers should have a low speed of rotation whereas economically-working steam turbines of low weight and small bulk should have a high speed of rotation. In the case of a cargo steamer having a speed of about ten nautical miles per hour, the screw propeller has, for instance, generally a speed of less than 100 revolutions per minute, whereas in the case of a steam turbine, the speed should be over 2,000 revs. per min. in order to get good conditions as regards weight, bulk and efficiency.

To make these great reductions in speed by means of one set of wheels would entail too large and heavy wheels, and it is advisable to make the reduction in speed in two stages for the above purpose.

For transmitting high powers from the fast-running steam turbines to the slowly-running driving shafts of the screw propellers, toothed gears are generally employed wherein the teeth are inclined to the axis of the wheel, that is to say, extend helically around the body of the wheel. By this inclined arrangement of the teeth, not only is a greater strength attained but also a steady running of the gearing.

Since the inclination of the teeth entail lateral tooth pressures, the teeth are generally made of V or Z shape, or the rings of teeth are employed in pairs having oppositely-directed teeth so as to balance the axial thrust. This construction is expensive and increases the weight of the engines.

For the purpose of simplifying the installation it has already been proposed to employ simple helical wheels instead of making the teeth of V or Z shape. In such cases, however, thrust bearings must be provided for the side shafts in addition to the already existing thrust bearings, namely, the thrust bearing for the propeller shaft which takes the propeller thrust and the thrust bearing for the turbine shaft which has to balance the axial thrusts occurring in the turbine. As compared with the simple conditions for taking the axial thrusts when the propeller shaft is driven directly by the turbine, where the thrust bearing has to take simply the difference between the propeller thrust and the unbalanced thrust of the motive medium in the turbine, the just-described apparatus is a complex, expensive and straggling arrangement.

The present invention has for its object to restore the use of simple helical wheels, and also to restore the simplicity and compact arrangement of the direct drive for taking the axial thrust.

This invention is based on the principle which is already being employed for solving in a different field of engineering a problem differing from the present one, and which principle consists in this that on a shaft carrying a driving wheel and a driven wheel, the inclinations of the teeth can be made such that axial thrusts cannot be produced upon the bearings of the said shaft. Each of the wheels mounted on the shaft is not relieved separately from axial thrusts, but on the contrary, the wheels mounted on the same shaft have their teeth so dimensioned as to exert equal but oppositely-directed axial thrusts upon the shaft. The teeth of one wheel are not arranged opposite to the teeth of the other wheel but in the same direction because it is a case of a driving wheel and of a driven wheel. Nevertheless, owing to the different diameters of the wheels the angles are different at which the teeth of the two wheels cross the axes of their shafts.

This principle has been employed hitherto solely in motor car engineering and has served to replace the noisy spur wheels by more quietly-running helical wheels without losing the axial slidability which is necessary for connecting and disconnecting the power, and which would be lost with the use of V or Z teeth. In solving the above-stated problem of a different kind in the field of marine turbine engineering, this principle is to be employed only for transmitting the thrust of the screw propeller or a portion thereof through the side shafts to the driving turbine shafts where it is taken by the thrust of the motive medium. The transmission of this thrust is effected by the oblique teeth of the gears without having to take axial thrusts in the bearings of the side shafts. The direction of the inclinations of the teeth is so chosen that the thrust of the toothed wheel mounted on the screw propeller shaft will oppose the thrust of the screw propeller so that the thrust bearing of the screw propeller shaft can be designed for smaller axial thrusts than those produced by the resistance of the ship. This resistance is transmitted wholly or partly through the side shafts to the turbine shaft, and is taken by the relieving devices of the turbine which are operated by the motive medium.

Consequently, as regards taking the axial thrusts, we have here again the thrust bearing which, as in non-direct drive, has to take only a part of the screw propeller thrust, whereas the other part is transmitted through the side shafts (which are relieved of axial bearing thrusts) to the driving shaft, and is usually balanced by the motive medium in the turbine. The side shafts which revolve at a medium speed of rotation, are preferably employed at the same time for driving auxiliary machinery because neither the high speeds of rotation of the driving turbines, nor the low speeds of rotation of the screw propeller shafts are suitable for driving light and economically-working auxiliary machinery. The axial thrusts occurring in this auxiliary machinery may also, according to the present invention, be balanced by a suitable choice of the inclinations of the teeth of the toothed wheels mounted on the same shafts.

The accompanying drawing illustrates diagrammatically a constructional example of an installation for driving a slow-running cargo steamer or passenger steamer.

$a$ is the driving turbine; for reasons of economy and small weight it is run at such a high speed of rotation that the reduction of the speed for the slow-running screw propeller shaft $b$ is made in two stages in order to avoid the use of wheels of too large diameters. To the fast-running turbine shaft there is coupled the pinion $c$ with which, in the illustrated constructional example two toothed wheels $d_1$ and $d_2$ mesh, which have teeth inclined to the axes of their wheels and each of which has to transmit one half of the power. These toothed wheels are fixed on the side shafts $e_1$ and $e_2$ which also carry the pinions $f_1$ and $f_2$ whose teeth mesh with the wheel $g$ mounted on the screw propeller shaft $b$. The bearings $h_1$ and $h_2$ of the side shafts $e_1$ and $e_2$ are relieved of axial thrusts by the fact that the teeth of the wheels $d_1$ and $d_2$ on the one hand, and of the pinions $f_1$, $f_2$ on the other hand are so inclined relatively to the axes of their wheels that the axial thrusts transmitted from the toothed wheels $d_1$ and $d_2$ to the side shafts $e_1$ and $e_2$ are balanced by equal but oppositely-directed axial thrusts of the pinions $f_1$ and $f_2$. Further, the direction of the inclination is so chosen that the axial thrust transmitted by the toothed wheel $g$ to the screw propeller shaft $b$ is oppositely-directed to the thrust of the screw propeller and thus diminishes the thrust that is to be taken by the thrust bearing $i$. On the other hand the thrust transmitted by the pinion $c$ to the fast-running shaft is balanced by the pressure of the expanding steam. The side shaft $e_1$ is utilized to drive the cold water pump $k$; and the side shaft $e_2$ is utilized to drive the air pump $m$. Both pumps are thus driven at speeds which allow of a construction favourable to economy with low weight and small bulk. The axial thrust occurring in each pump is balanced by a suitable choice of the inclination of the teeth of the toothed wheels mounted on the same shaft.

It is obvious that in addition to the auxiliary machinery required for condensing purposes other auxiliary machinery may be driven from the side shafts and their auxiliary thrusts may be transmitted and taken by a suitable choice of the inclination of the teeth in the manner described.

What I claim is:—

1. A multi-stage speed reducing helical toothed wheel gearing for ship propulsion by means of turbines including a single helical toothed wheel on a turbine shaft, a single helical toothed wheel on a propeller shaft, an intermediate shaft carrying two single helical toothed wheels which mesh respectively with the said turbine shaft toothed wheel and the propeller shaft toothed wheel, the angles of inclination of the helical teeth of said pairs of wheels being selected so that axial thrust on the said intermediate shaft is eliminated, the axial thrust of the helical toothed wheel on the propeller shaft is balanced by the thrust of the propeller and the axial thrust of the helical toothed wheel on the turbine shaft is balanced by the axial thrust of the turbine.

2. A multi-stage speed reducing helical toothed wheel gearing for ship propulsion by means of turbines including a single helical toothed wheel on a turbine shaft, a single helical toothed wheel on a propeller shaft, a plurality of intermediate shafts each carrying two single helical toothed wheels which mesh respectively with the said turbine shaft toothed wheel and the propeller shaft toothed wheel, the angles of inclination of the helical teeth of said pairs of wheels being selected so that axial thrust on the said intermediate shafts is eliminated, the axial thrust of the helical toothed wheel on the propeller shaft is balanced by the thrust of the propeller and the axial thrust of the helical toothed wheel on the turbine shaft is balanced by the axial thrust of the turbine.

3. A multi-stage speed reducing helical toothed wheel gearing for ship propulsion by means of turbines including a single helical toothed wheel on a turbine shaft, a single helical toothed wheel on a propeller shaft, an intermediate shaft driving auxiliary machinery which has a resultant end thrust on the intermediate shaft and carrying two single helical toothed wheels which mesh respectively with the said turbine shaft toothed wheel and the propeller shaft toothed wheel, the angles of inclination of the helical teeth of said pairs of wheels being selected so that axial thrust on the said intermediate shaft is eliminated, the axial thrust of the helical toothed wheel on the propeller shaft is balanced by the thrust of the propeller and the axial thrust of the helical toothed wheel on the turbine shaft is balanced by the axial thrust of the turbine.

4. A multi-stage speed reducing helical toothed wheel gearing for ship propulsion by means of turbines, including a single helical toothed wheel on a turbine shaft, a single helical toothed wheel on a propeller shaft, an intermediate shaft carrying two single helical toothed wheels which mesh respectively with the said turbine shaft toothed wheel and the propeller shaft toothed wheel, the angles of inclination of the helical teeth of said pairs of wheels being selected so that axial thrust on the said intermediate shaft is eliminated.

5. A multi-stage speed reducing helical toothed wheel gearing for ship propulsion by means of turbines, comprising a turbine, a propeller, a single helical toothed wheel on the turbine shaft, a single helical toothed wheel on the propeller shaft, an intermediate shaft carrying two single helical toothed wheels which mesh respectively with the said turbine shaft toothed wheel and the said propeller shaft toothed wheel, and a thrust block arranged on said turbine shaft, the angle of inclination of the helical teeth of said meshing pairs of wheels being so selected that axial thrust on said intermediate shaft is eliminated.

In testimony whereof I have signed my name to this specification.

KARL RÖDER.